(12) United States Patent  
Marrone

(10) Patent No.: US 12,248,610 B1
(45) Date of Patent: Mar. 11, 2025

(54) SECURE MOBILE BANKING SESSION

(71) Applicant: Citibank, N.A., New York, NY (US)

(72) Inventor: Michael Marrone, New York, NY (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/383,114

(22) Filed: Oct. 24, 2023

(51) Int. Cl.
G06F 21/00 (2013.01)
G06F 21/62 (2013.01)
G06F 21/84 (2013.01)

(52) U.S. Cl.
CPC .......... G06F 21/6245 (2013.01); G06F 21/84 (2013.01)

(58) Field of Classification Search
CPC .............................. G06F 21/6245; G06F 21/84
See application file for complete search history.

(56) References Cited

U.S. PATENT DOCUMENTS

2015/0379303 A1* 12/2015 LaFever .............. G06F 21/6254 726/28
2016/0381026 A1* 12/2016 Silva Pinto ........... H04W 12/08 726/4
2017/0164201 A1* 6/2017 Li ........................... G06F 21/57
2017/0213426 A1* 7/2017 Schwartz .............. G07F 7/1091
2018/0068132 A1* 3/2018 Zubair .................... G06F 21/44
2018/0082085 A1* 3/2018 Yau ......................... G06F 21/74
2023/0216835 A1* 7/2023 Hoffman ................. H04L 63/04 726/26

OTHER PUBLICATIONS

International Search Report and Written Opinion on International Application No. PCT/US2024/051477 dated Nov. 7, 2024 (8 Pages).

* cited by examiner

Primary Examiner — Ghazal B Shehni
(74) Attorney, Agent, or Firm — Foley & Lardner LLP

(57) ABSTRACT

Presented herein are systems and methods for enabling a secure browsing session. Embodiments may include a computing device that executes software routines to receive a first indication to enter a secure browsing mode of a session; present data associated with a user for display on the display of the electronic device; cause the display to obscure one or more personally identifiable information of the data on the display of the electronic device; receive a second indication to reveal the one or more personally identifiable information; present the one or more personally identifiable information for display on the display of the electronic device.

17 Claims, 6 Drawing Sheets

SECURE MOBILE BANKING SESSION

TECHNICAL FIELD

This application generally relates to providing secure mobile browsing sessions.

BACKGROUND

Sensitive information (e.g., personally identifiable information) can be used by bad actors to steal money, information, and identities. Keeping sensitive information private in an increasingly connected world is becoming more difficult as access to one's own sensitive information is readily available. For example, a user's mobile device (e.g., mobile phone or laptop computer) presents numerous opportunities to display sensitive information on the screen of the mobile device, regardless of whether the user is in an unsecure (e.g., public) location. In many of these situations, sensitive data may be inadvertently displayed to strangers in the vicinity of the user.

SUMMARY

Disclosed herein are systems and methods capable of addressing the above-described shortcomings and may also provide any number of additional or alternative benefits and advantages. A system as described herein may present a user the option to obscure sensitive information globally across a browsing session on an electronic device. The system may then individually reveal sensitive information upon receiving an indication from a user to display the sensitive information. For example, the user may click (or touch) and hold obscured sensitive information to reveal the sensitive information on the display of the electronic device.

In some aspects, the techniques described herein may relate to a computer-implemented method including receiving, by one or more processors, a first indication to enter a secure browsing mode of a session; presenting, by the one or more processors, data associated with a user for display on a display of an electronic device; causing, by the one or more processors, the display to obscure one or more personally identifiable information of the data on the display of the electronic device; receiving, by the one or more processors, a second indication to reveal the one or more personally identifiable information; and presenting, by the one or more processors, the one or more personally identifiable information for display on the display of the electronic device.

The one or more processors may cause the display of the electronic device to obscure the one or more personally identifiable information of the data on the display of the electronic device by blurring the one or more personally identifiable information.

The one or more processors may receive the second indication in response to the user interacting with the obscured personally identifiable information.

The method may further include presenting, by the one or more processors, the one or more personally identifiable information for display on the display of the electronic device for a predetermined amount of time; and causing, by the one or more processors, the display to obscure the one or more personally identifiable information of the data on the display of the electronic device after the predetermined amount of time passes.

The method may further include presenting, by the one or more processors, the one or more personally identifiable information for display on the display of the electronic device while the one or more processors are receiving the second indication; and causing, by the one or more processors, the display to obscure the one or more personally identifiable information of the data on the display of the electronic device when the one or more processors stop receiving the second indication.

The electronic device may be associated with a second user and the second indication is received from a user device associated with the user.

The session may be associated with a browsing session of a financial institution account associated with the user.

In some aspects, the techniques described herein may relate to a system including an electronic device including a display; and one or more processors configured to execute machine-readable instructions to perform steps including: receiving a first indication to enter a secure browsing mode of a session; presenting data associated with a user for display on the display of the electronic device; causing the display to obscure one or more personally identifiable information of the data on the display of the electronic device; receiving a second indication to reveal the one or more personally identifiable information; and presenting the one or more personally identifiable information for display on the display of the electronic device.

The one or more processors may be further configured to cause the display of the electronic device to obscure the one or more personally identifiable information of the data on the display of the electronic device by blurring the one or more personally identifiable information.

The one or more processors may be further configured to receive the second indication in response to the user interacting with the obscured personally identifiable information.

The one or more processors may be further configured to: present the one or more personally identifiable information for display on the display of the electronic device for a predetermined amount of time; and cause the display to obscure the one or more personally identifiable information of the data on the display of the electronic device after the predetermined amount of time passes.

The one or more processors may be further configured to: present the one or more personally identifiable information for display on the display of the electronic device while the one or more processors are receiving the second indication; and cause the display to obscure the one or more personally identifiable information of the data on the display of the electronic device when the one or more processors stop receiving the second indication.

The electronic device may be associated with a second user and the second indication is received from a user device associated with the user.

The session may be associated with a browsing session of a financial institution account associated with the user.

In some aspects, the techniques described herein may relate to a computer-readable medium including a non-transitory storage memory configured to store machine-readable instructions that when executed by one or more processors instruct the one or more processors to perform steps including: receiving a first indication to enter a secure browsing mode of a session; presenting data associated with a user for display on the display of an electronic device; causing the display to obscure one or more personally identifiable information of the data on the display of the electronic device; receiving a second indication to reveal the one or more personally identifiable information; and presenting the one or more personally identifiable information for display on the display of the electronic device.

The one or more processors may be further configured to cause the display of the electronic device to obscure the one or more personally identifiable information of the data on the display of the electronic device by blurring the one or more personally identifiable information.

The one or more processors may be further configured to receive the second indication in response to the user interacting with the obscured personally identifiable information.

The one or more processors may be further configured to: present the one or more personally identifiable information for display on the display of the electronic device for a predetermined amount of time; and cause the display to obscure the one or more personally identifiable information of the data on the display of the electronic device after the predetermined amount of time passes.

The one or more processors may be further configured to: present the one or more personally identifiable information for display on the display of the electronic device while the one or more processors are receiving the second indication; and cause the display to obscure the one or more personally identifiable information of the data on the display of the electronic device when the one or more processors stop receiving the second indication.

The electronic device may be associated with a second user and the second indication is received from a user device associated with the user.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
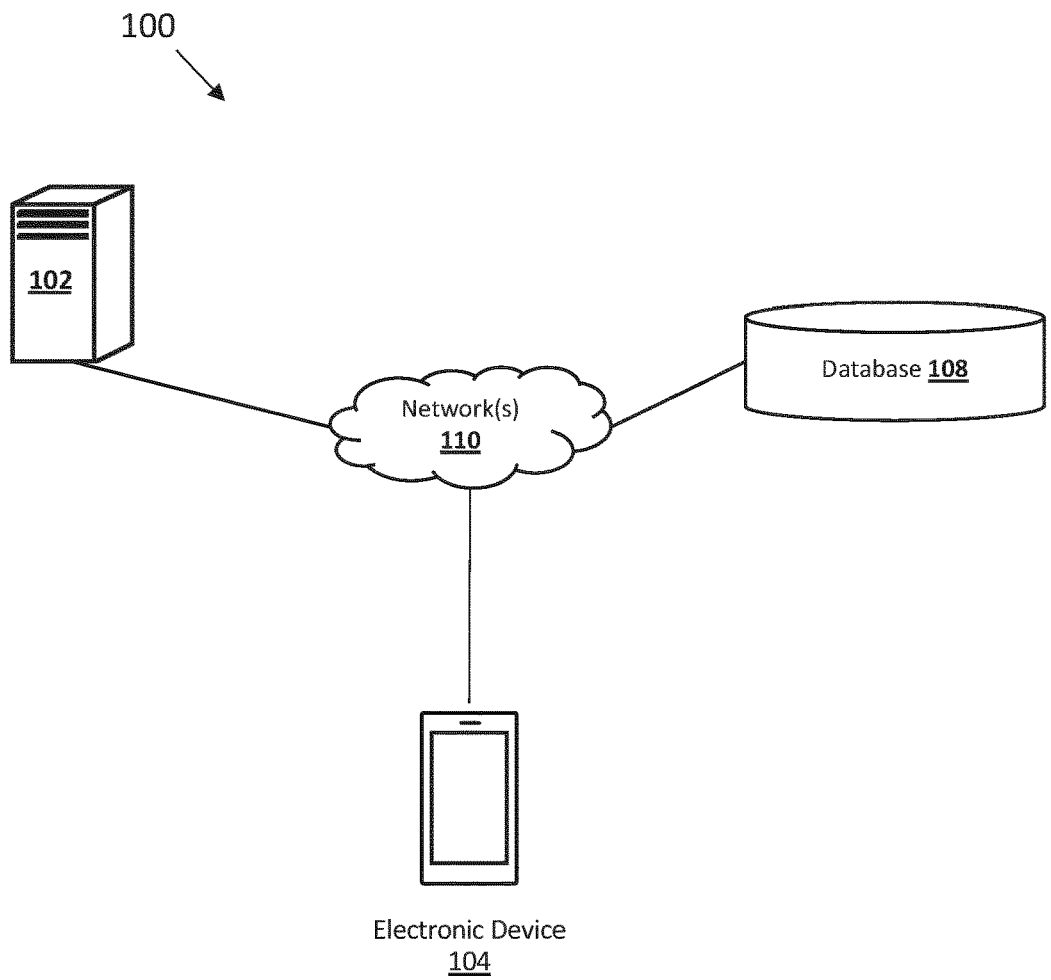
FIG. 1 is a block diagram of a network environment, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The present disclosure generally relates to providing a selectably secure browsing session of sensitive information on an electronic device (e.g., computer, mobile device, tablet, augmented reality headset, smart watch, laptop, etc.) by allowing a user of the electronic device to selectably determine to enter a secure browsing session. For example, a user may initiate a mobile application (e.g., a banking mobile application) on the electronic device. In some embodiments, the electronic device may be associated with the user. In other embodiments, the electronic device may not be associated with the user. If the mobile application may potentially display sensitive information (e.g., personally identifiable information), the mobile application may present the user with a selectable option to toggle between a secure browsing session and a default browsing session. In the secure browsing session, sensitive information is obscured from view on the display until the user selectably reveals the sensitive information. In the default browsing session, the sensitive information is legibly presented on the display of the electronic device. The user may select between the two options with a selectable indicator (e.g., a button, toggle, slider, checkbox, etc.).

In some embodiments, upon the user selecting a secure browsing session, the mobile application functions in substantially the same way as the default browsing session except that sensitive information is obscured from view. Selecting the secure browsing session toggles an application-wide (or system-wide) obfuscation of sensitive information (e.g., a global secure browsing session). While within the secure browsing session, the user is presented with the option to individually reveal the obscured data. For example, the mobile application (e.g., system) may receive an indication of a press and hold of an interactive element (e.g., the obscured data) to temporarily reveal the obscured sensitive information and then correspondingly reveal the obscured sensitive information. In some embodiments, the system may receive an indication to selectably reveal individual sensitive information (e.g., an account balance but not the account number). In other embodiments, the system may receive an indication to selectably reveal multiple sensitive information at the same time (e.g., revealing an account number and balance at the same time).

Within the scope of the present disclosure, sensitive information may include financial and medical information, criminal records, genetic or biometric data, sexual orientation, racial or ethnic origin, political beliefs, religious beliefs, trade-union membership, consumer information, health plans, beneficiary information, web URLs, identifiers, serial numbers, IP address, full-face photos, geographic data, fax numbers, any unique identifying number code, passwords, usernames, etc. It should be understood that sensitive information may include additional data not described above.

Sensitive information may also include personally identifiable information, which may include one or more of the following information: full name, social security number, driver's license number, passport number, email address, physical address, phone number, date of birth, and biometric information such as fingerprints or facial recognition data, credit card numbers, bank account details, and personal health information. It is understood that personally identifiable information may include data not described above. Within the scope of the present disclosure, the terms sensitive information and personally identifiable information may be used interchangeably, though they need not be.

Turning now to the figures, FIG. 1 shows components of a system 100 for providing a secure browsing session on an electronic device 104, according to an embodiment. The system 100 may include a server 102, a database 108, and an electronic device 104. The various devices and components of the system 100 may communicate with one another via one or more networks 110.

For ease of description and understanding, FIG. 1 depicts the system 100 as having only one or a small number of each component. Embodiments may, however, comprise additional or alternative components, or omit certain components, from those of FIG. 1 and still fall within the scope of this disclosure. As an example, it may be common for embodiments to include multiple servers 102 and/or multiple databases 108 that are communicably coupled to the server 102 and the electronic device 104 through the network 110. Embodiments may include or otherwise implement any number of devices capable of performing the various features and tasks described herein. For instance, FIG. 1 depicts the database 108 as hosted as a distinct computing device from the server 102, though, in some embodiments, the server 102 may include an integrated database 108 hosted by the server 102.

The system 100 includes one or more networks 110, which may include any number of internal networks, external networks, private networks (e.g., intranets, VPNs), and public networks (e.g., Internet). The networks 110 comprise various hardware and software components for hosting and conduct communications amongst the components of the system 100. Non-limiting examples of such internal or external networks 110 may include a Local Area Network (LAN), Wireless Local Area Network (WLAN), Metropolitan Area Network (MAN), Wide Area Network (WAN), and the Internet. The communication over the networks 110 may be performed in accordance with various communication protocols, such as Transmission Control Protocol and Internet Protocol (TCP/IP), User Datagram Protocol (UDP), and IEEE communication protocols, among others.

The electronic device 104 may be any type of electronic device comprising hardware components (e.g., one or more processors, non-transitory storage) and software components capable of performing the various processes and tasks described herein. Non-limiting examples of the electronic device 104 include personal computers (e.g., laptop computers, desktop computers), server computers, mobile devices (e.g., smartphones, tablets), VR devices, and gaming consoles, smart watches, among other types of electronic devices.

Figure 3:
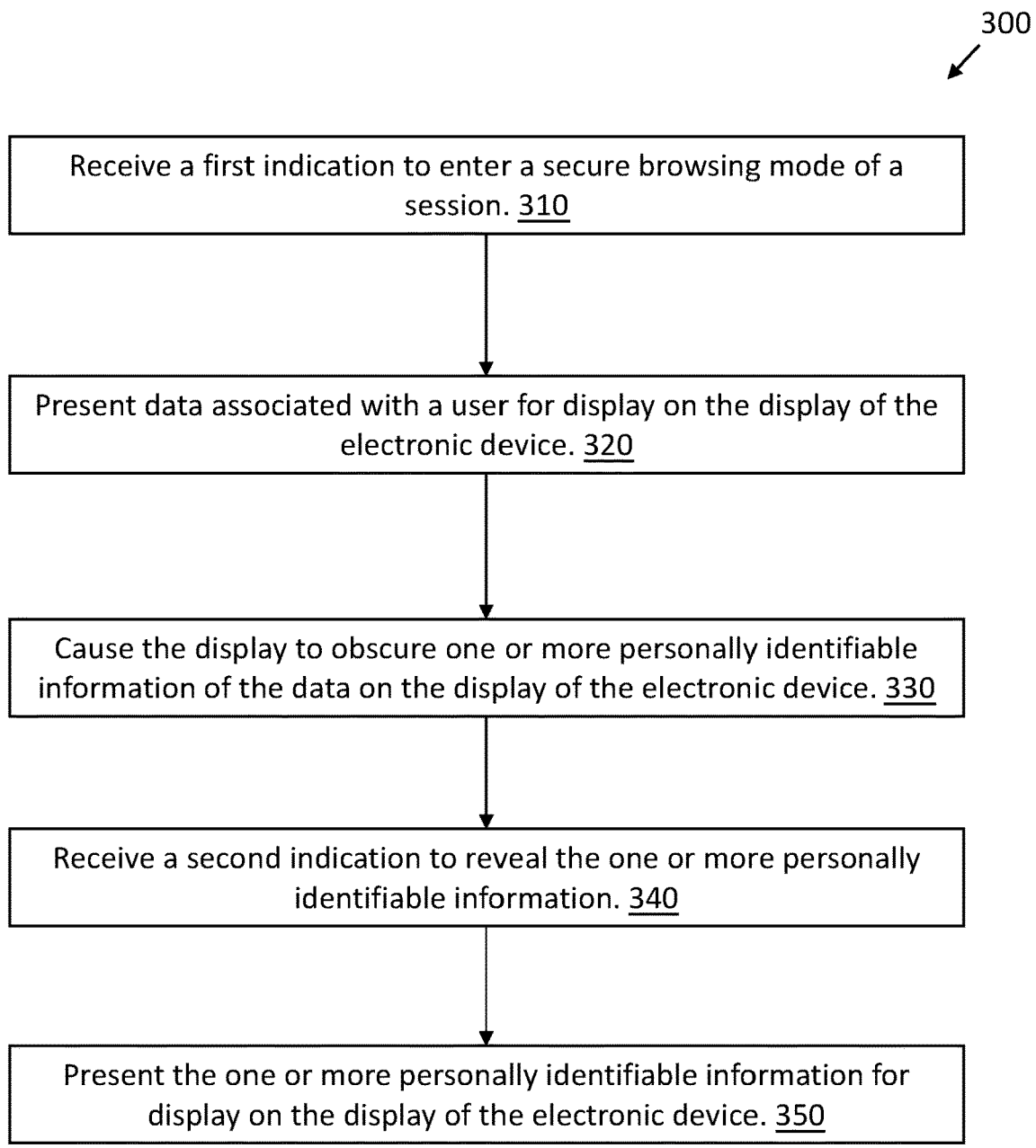
FIG. 3 is a depiction of a method for locally revealing sensitive information while executing a secure browsing session, according to an embodiment.

The server 102 may execute one or more software programs to perform various methods and processes (e.g., the process 300 of FIG. 3). The server 102 may include one or more computing devices configured to perform various processes and operations disclosed herein. In some embodiments, the server 102 may be a computer or computing device capable of performing methods disclosed herein. The server 102 may include a processor and non-transitory, computer readable medium including instructions, which, when executed by the processor, caused the processor to perform methods disclosed herein. The processor may include any number of physical, hardware processor. Although FIG. 1 shows only a single server 102, the server 102 may include any number of computing devices. In some cases, the computing devices of the server 102 may perform all or portions of the processes and benefits of the server 102. The server 102 may comprise computing devices operating in a distributed or cloud computing configuration and/or in a virtual machine configuration. It should also be appreciated that, in some embodiments, functions of the server 102 may be partly or entirely performed by the electronic device 104.

For example, the electronic device 104 may execute one or more software programs to perform various methods and processes (e.g., the process 300 of FIG. 3). The electronic device 104 may include one or more computing devices configured to perform various processes and operations disclosed herein. In some embodiments, the electronic device 104 may be a computer or computing device capable of performing methods disclosed herein. In some embodiments, the electronic device 104 may be a mobile computing device (e.g., cellular device). The electronic device 104 may include a processor and non-transitory, computer-readable medium including instructions, which, when executed by the processor, caused the processor to perform methods disclosed herein. The processor may include any number of physical, hardware processors. Although FIG. 1 shows only a single electronic device 104, the electronic device 104 any include any number of computing devices. In some cases, the computing devices of the electronic device 104 may perform all or portions of the processes and benefits of the electronic device 104. The electronic device 104 may comprise computing devices operating in a distributed or cloud computing configuration and/or in a virtual machine configuration.

According to an exemplary embodiment, the electronic device 104 may be a mobile computing device (e.g., a cellphone) capable of executing one or more mobile applications. The mobile application executable by the electronic device 104 may be any mobile application that displays, for the user to view, sensitive information. In some embodiments, the sensitive information is associated with a user of the electronic device 104. In some embodiments, the sensitive information is not associated with the user of the electronic device 104. For example, the sensitive information may be associated with a family member, agent, or delegate of the user of electronic device 104. In other embodiments, the sensitive information is associated with a client of an entity. By way of example, the user of the electronic device 104 may be a customer service personnel of a financial institution and the sensitive information may be associated with a client of the financial institution. In such embodiments, the sensitive information of the client is obscured from view of the customer service personnel until such time as the client provides approval to reveal the sensitive information through a client device.

In other embodiments, the sensitive information is of the user and the electronic device 104 is associated with the user. By way of example, the electronic device 104 provides access to, and executes, a mobile application of a financial institution of which the user is a client. The mobile application provides access to personally identifiable information or other sensitive information. Further, the electronic device 104 may provide a means by executing the mobile application to display the sensitive information on a screen. In some embodiments, the screen may be integrated in the electronic device 104 or may be separate from the electronic device 104 (e.g., on an external monitor, VR headset, remote device, etc.).

The electronic device 104 may include one or more security measures to protect the contents and information stored on the electronic device 104 and or accessible through the electronic device 104. For example, the electronic device 104 may employ a username/password protocol to authenticate the user prior to use of the electronic device. In some embodiments, the security measures may be employed upon initiation of the electronic device 104. In other embodiments, the security measures may be executed at the initiation of the mobile application. The security measures may include a password and username authentication, biometric authentication, token authentication, pin authentication, security question authentication, and/or any other means to authenticate the identity of the user. The electronic device 104 may store locally the security data (passwords, usernames, pins, security questions, tokens, biometric data, etc.) and access the stored data upon execution of the security protocols in order to authenticate one or more received security inputs. In other embodiments, the security information may be stored remotely (e.g., at database 108) and accessed through one or more networks 110. The electronic device may authenticate a user input into the electronic device 104 (e.g., through touch, sound, or image) by comparing the stored security authentication information the user input.

The mobile application may be hosted and/or executed locally on the electronic device 104 or remotely on the server 102. The methods and systems described herein may be executed in substantially the same manner whether the mobile application is hosted and/or executed on the electronic device 104 locally or remotely on server 102.

The database 108 may store various information from the server 102 and/or the electronic device 104. In addition, database 108 may store various information from one or more websites. According to an embodiment, the database 108 may store sensitive information of the user for display on the electronic device 104 when the mobile application or system is executed by the electronic device 104. The sensitive information stored in database 108 may be uploaded and/or updated by the user through means of the electronic device 104 or other computing device. Additionally, or alternatively, the server 102 may store and update the sensitive information in the database 108. The server 102 may aggregate information from a single source (e.g., a financial institution), or from a multitude of sources (e.g., the financial institution, a medical institution, a commercial institution, a religious institution, a civic institution, social media, public records, etc.).

Figure 2A:
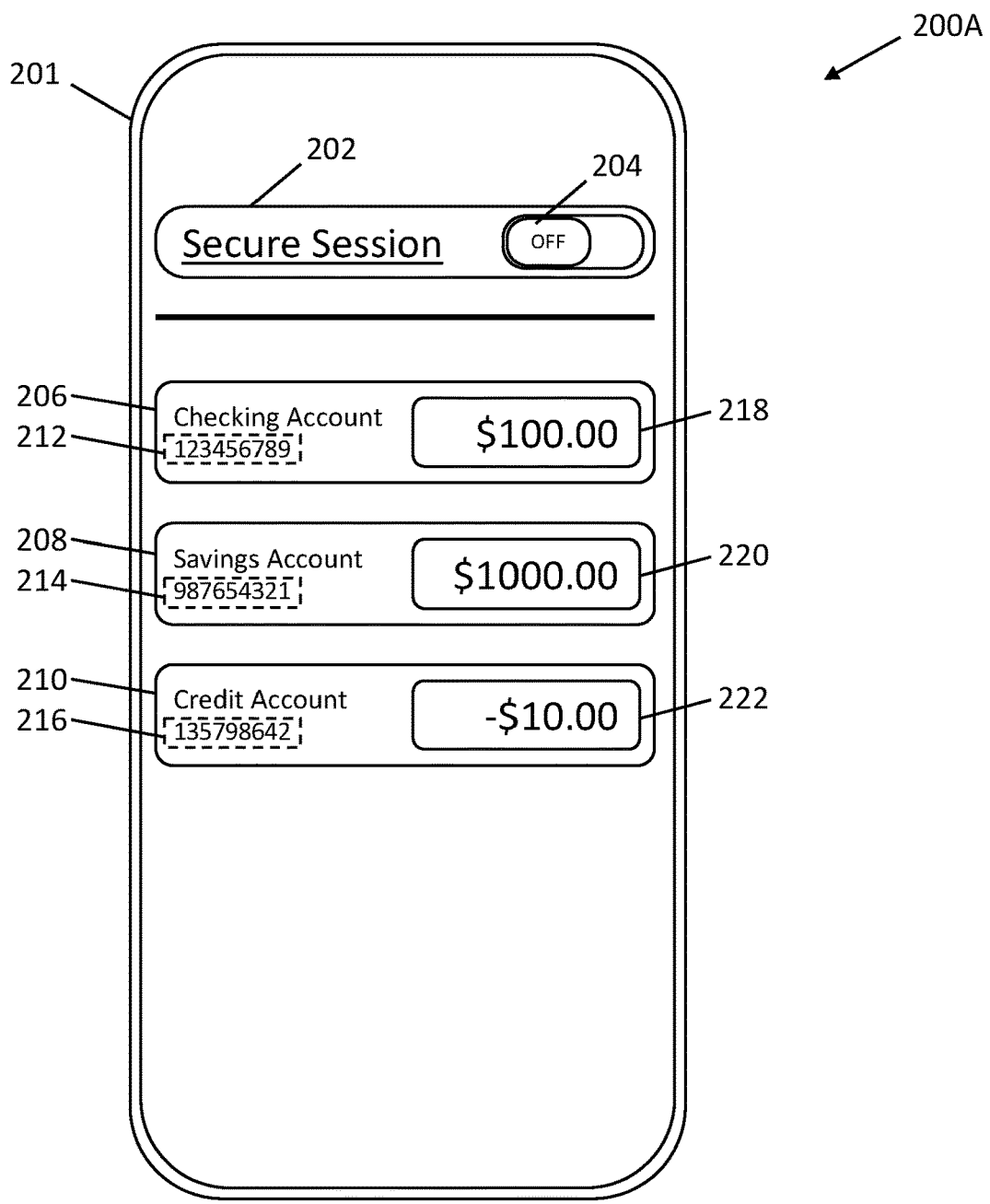
FIG. 2A is a depiction of an electronic device executing a default browsing session, according to an embodiment.

Turning now to FIG. 2A, a system 200A is shown being executed and displayed by an electronic device 201, according to an exemplary embodiment. The electronic device 201 may include a display for presenting information. The display may be configured to communicate with one or more processors of the electronic device 201, the one or more processors in communication with a server (e.g., server 102 of FIG. 1.) and/or a database (e.g., 108 of FIG. 1.) through a network (e.g., network 110 of FIG. 1.). The system 200A may be a mobile application executing on the electronic device 201.

In executing the system 200A, the electronic device 201 may present to the user a secure session selection 202. The secure session selection 202 may be a graphical user interface ("GUI"), as shown in FIG. 2A. In addition, the secure session selection 202 may include one or more interactive elements having a visual attribute similar to the look and feel of the system 200A. The look and feel of the system 200A may include one or more attributes including shape of graphical elements (e.g., rounded corners, size of elements, etc.), spacing of graphical elements, color of graphical elements, movement or graphical elements, color palette of graphical element, etc.

In an exemplary embodiment, as shown in FIG. 2A, system 200A is associated with a financial institution. However, in some embodiments, the system 200A is a standalone system that executes on top of other mobile applications or systems. For example, system 200A may only include the secure session selection 202, and the remainder of the graphical elements (e.g., checking account 206, savings account 208, etc.) are being displayed by a separate system. In such embodiments, the system 200A may identify a look and feel of the separate system and adjust one or more visual attributes of the secure session selection 202 and associated interactive elements to match the look and feel of the separate system.

In one embodiment, the interactive element may be a secure session toggle 204. As described above, the secure session selection 202 may be presented as part of a first party financial institution mobile application. Additionally, or alternatively, the secure session selection 202 may be hosted by a separate server or mobile application that is able to view/read data displayed on the screen of the electronic device 201 (or in a memory or database that may be accessed by one or more processors of the electronic device 201). In such embodiments, the secure session selection 202 may present an option to enter a secure browsing session when sensitive information is displayed (or may be displayed) on the electronic device 201 or read in a database or memory. The secure session selection 202 may read the data being displayed or stored in the database or memory to make a determination as to whether data displayed is sensitive information based on machine learning and artificial intelligence models. This machine learning architecture may include various layers and functions for ingesting data, parsing the data, labelling the data, and making determinations as to whether or not the data is sensitive information. For example, a particular field may be labeled as containing sensitive data (e.g., an "account number" may be designated in the code of the page, metadata, or otherwise labeled as being sensitive data that should be obscured). In other embodiments, the system 200A may compare information to a known format for which sensitive information is stored. For example, Social Security numbers may be displayed in a known format (e.g., XXX-XX-XXXX). If data being displayed (or stored in a memory or database) matches a known sensitive information format (e.g., XXX-XX-XXXX), then the secure session selection 202 may be displayed for the user to select a secure browsing session or a default browsing session. In other embodiments, the data to be displayed may include a label in metadata that alerts the system 200A that sensitive information may be presented. In such a case, the secure session selection 202 may be presented. In other embodiments, the secure session selection 202 is always displayed on the display of the electronic device 201 when the electronic device 201 is on.

The secure session toggle 204 may be configured to receive a user input by way of touch, sound, gesture, and/or vision. Upon receiving the user input, the state of the secure session toggle 204 may be changed from a first state (e.g., the default browsing session) to a second state (e.g., a secure browsing session). The secure session toggle 204 may include one or more visual and/or auditory indicia to communicate to the user the state of the system 200A. The visual indicia may include changing colors, orientation of graphics, position of graphics, size of graphics, shape of graphics, movement of graphics, etc. Auditory indicia may include sounds and/or words. Additionally, the system 200A may include haptic feedback to the user to provide tactile indicia of the change in state in response to the received input. The system 200A receives the user input and executes one or more protocols and/or methods in response to the received indication. In some embodiments, the system 200A initiates the default browsing session by default upon startup of a mobile application. In other embodiments, the system 200A initiates a secure browsing session by default upon startup of the mobile application. For example, responsive to receiving an indication from the electronic device that the mobile application has been launched, the system 200A may automatically initiate the secure browsing session by setting the secure session toggle 204 to the second state (e.g., the secure browsing session). In some embodiments, the secure session toggle 204 need not be presented for display on the display of the electronic device 201. In some embodiments, the system 200A requires the user input into the secure session selection 202 prior to initiating a browsing session. This input is used to determine a global security browsing state (e.g., a security level across the entire system 200A or mobile application).

As shown in FIG. 2A, the secure session toggle 204 is set to an "OFF" state, which may correspond to a default browsing session. This state may be indicated by the secure session toggle 204 as shown in FIG. 2A. In the default browsing session state, sensitive information is unobscured and legibly displayed. For example, the system 200A may display a checking account 206, a savings account 208, and a credit account 210. A first graphical element corresponding to the checking account 206, the system 200A may include a checking account number 212 and/or a checking account amount 218. A second graphical element corresponding to the savings account 208, the system 200A may include a savings account number 214 and/or a savings account amount 220. A third graphical element corresponding to the credit account 210, the system 200A may include a credit account number 216 and/or a credit account amount 222.

In some embodiments, the secure session toggle 204 may be automatically adjusted from the first state to the second state (and vice versa) in response to one or more triggers. In an exemplary embodiment, the trigger may correspond with the user input (e.g., interaction with the secure session toggle 204). In another embodiment, the trigger may come from the system 200A determining that sensitive information is to be displayed on the display of the electronic device 201. In such an embodiment, the system 200A may automatically adjust a position of the secure session toggle 204 to a secure browsing session state. In another embodiment the secure session toggle 204 may automatically adjust states due to a geofencing trigger. For example, the user may indicate that the user's home is a secure location. In such an embodiment, the system 200A may receive the user indication and in response the secure session toggle 204 may automatically adjust to the default browsing session when it is determined by the system 200A that the electronic device 201 is within a geofence of the user's home. Correspondingly, when the system 200A determines based on a received or determined location of the electronic device 201 that the electronic device 201 is removed from the geofenced home location, the secure session toggle 204 may automatically adjust states to initiate a secures browsing session. In such embodiments, a user may browse securely when in an unsecure location (e.g., public, work, transit, etc.) and browse in a normal or default mode when in a secure location (e.g., home, work, personal vehicle, etc.). In such embodiments, the user may apply the geofence locations and/or the system 200A may execute one or more machine learning frameworks to determine when a user is in a secure location and/or an unsecure location based on previous user adjustments of the secure session toggle 204 and associated locations.

In another embodiment, inputs from one or more sensors may be used to determine which state of the secure session toggle 204 to apply. For example, a camera may be used to determine the presence and/or identity of people surrounding the electronic device 201. By way of example, a front facing camera of the electronic device 201 may be used to determine if anyone besides the user is in the proximity of the electronic device 201. Upon sensing the presence of an additional person other than the user within the vicinity of electronic device 201, the secure session toggle 204 may automatically be adjusted to enter a secure browsing session. In contrast, when no additional person is sensed by the front facing camera, the secure session toggle 204 is automatically adjusted to enter the default browsing session. Alternative embodiments may use a back facing camera, a microphone, proximity sensors, and/or any suitable sensor housed in or on the electronic device 201 to determine the presence of people other than the user. In other embodiments, system 200A may identify known and unknown persons in proximity (up to a threshold distance) of the electronic device 201. Upon sensing the presence of an unknown person within the threshold distance of the electronic device 201, the system 200A may automatically enter a secure browsing session.

The secure session selection 202 and/or secure session toggle 204 need not be displayed at all times on the electronic device 201. For example, the secure session selection 202 and/or secure session toggle 204 may be displayed at the initiation of the mobile application execution for the user to select a browsing state. Upon receiving a selection, the secure session selection 202 and secure session toggle 204 may be removed from the display unless accessed again through a settings menu. In other embodiments, the secure session selection 202 and secure session toggle 204 are presented at all times during a browsing session, which may begin at the initiation of the mobile application or turning on the electronic device 201 and end upon turning off the electronic device 201 or ending the mobile application.

Figure 2B:
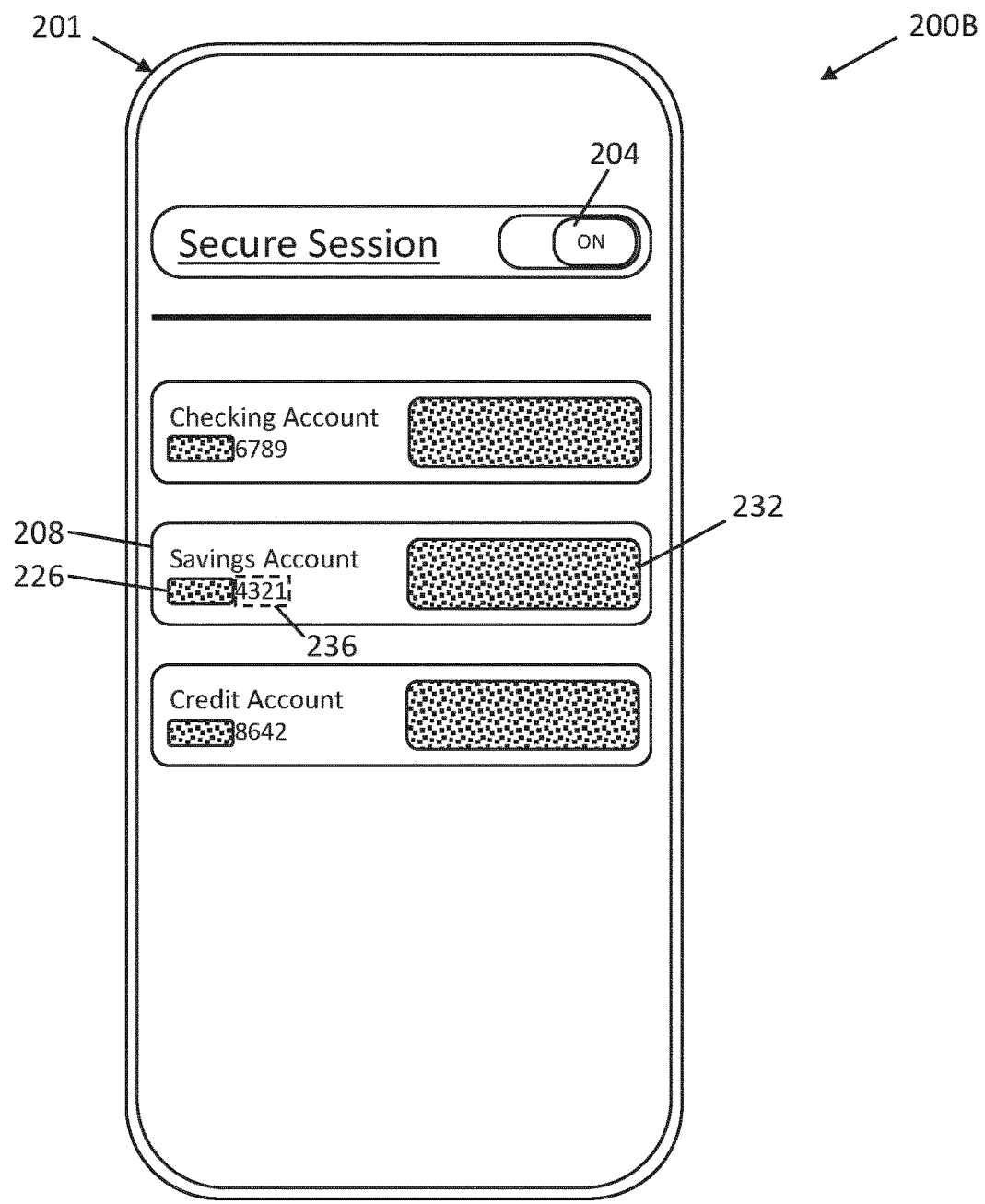
FIG. 2B is a depiction of an electronic device executing a secure browsing session, according to an embodiment.
Figure 2C:
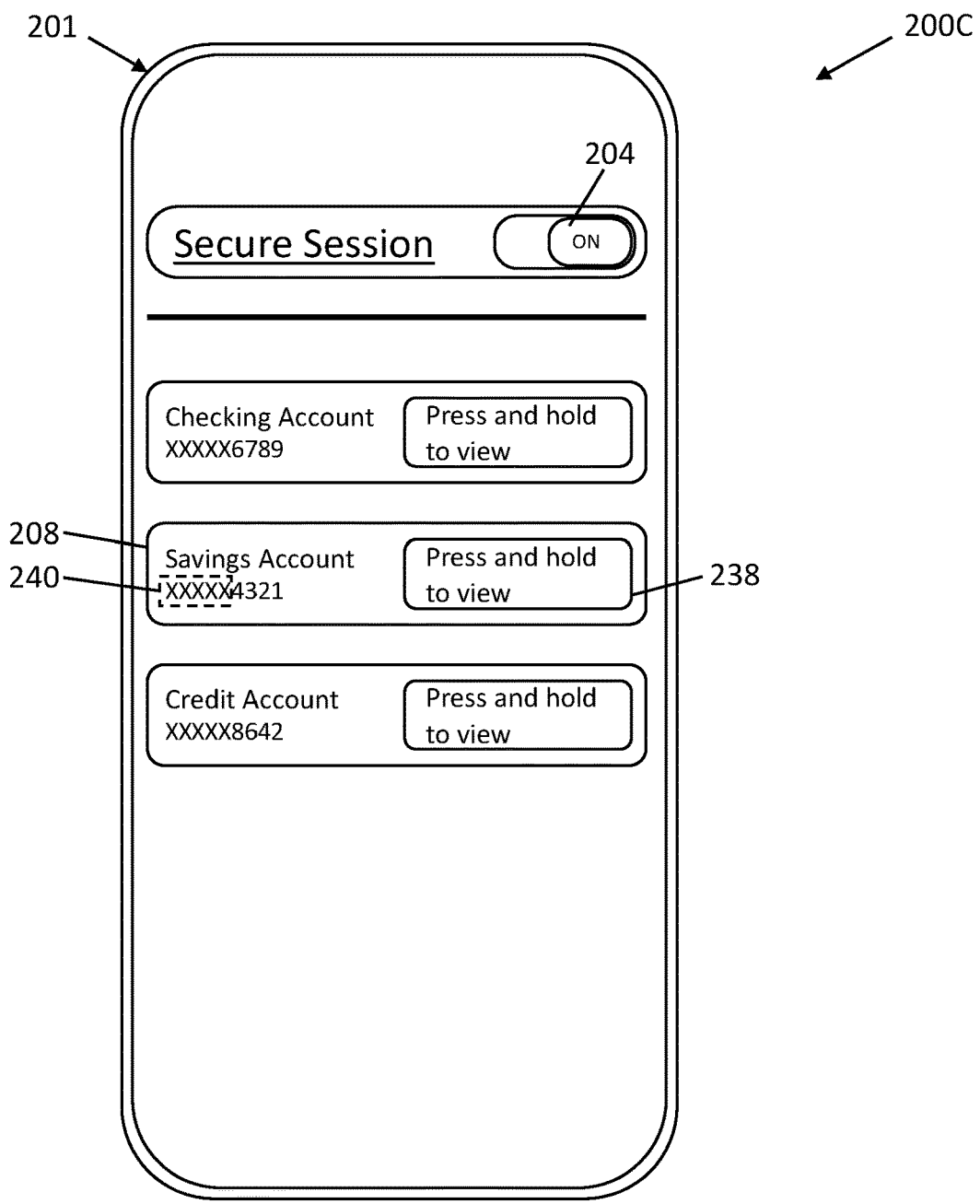
FIG. 2C is a depiction of an electronic device executing a secure browsing session, according to an embodiment.

In some embodiments, the obfuscation of the sensitive information (as shown in FIGS. 2B and 2C) is a static obfuscation (e.g., no movement of the graphical element used to obfuscate the sensitive information). In other embodiments, the obfuscation of the sensitive information (as shown in FIGS. 2B and 2C) is a dynamic obfuscation (e.g., including motion or changing elements that further highlight the obfuscation of sensitive information). For example, the system 200A may include visual motion graphics with the obfuscation 232 (e.g., a wave motion, a shimmer, a jitter, etc.).

Turning now to FIG. 2B, a system 200B is shown executing a secure browsing session on the electronic device 201, according to an exemplary embodiment. Upon receiving an indication of the user's interaction with the secure session toggle 204, the secure session toggle 204 is adjusted to a secure browsing session state. In the secure browsing session state, sensitive information is obscured from display on the electronic device 201. For example, the savings account 208 may include one or more obfuscations 226, 232 that are used to obscure sensitive information. By way of example, obfuscation 226 is used to blur the first five digits of the savings account number 214 (as shown in FIG. 2A). In some embodiments, the last four digits 236 of the savings account number 214 are still visible while in the secure browsing session state. In some embodiments, the last four digits 236 of the savings account number 214 may also be obscured by the obfuscation 226. The obfuscation 232 may blur the total amount of the savings account amount 220 (as shown in FIG. 2A). While the obfuscations 226, 232 are shown in FIG. 2B as blurring the sensitive information, it should be understood that any form of obfuscation of the sensitive information may be used.

For example, when in a secure browsing state, as determined by the secure session toggle 204, the obfuscation 226 may blur, cover, change, hide, adjust contrast, remove, or otherwise keep from view the sensitive information from being displayed on the electronic device 201. In some embodiments, the actual data to be displayed is altered (e.g., the sensitive information itself is blurred) by the system 200B. In other embodiments, additional graphical elements are superimposed on the sensitive information so as to hide the sensitive information from view (e.g., a graphical element may be placed on top of the sensitive information to hide the sensitive information). In some embodiments, the sensitive information is simply not displayed.

As mentioned above, the secure session toggle 204 may automatically adjust to a secure browsing session state upon one or more triggers. Upon changing from a default browsing session state (as shown in FIG. 2A) to a secure browsing session state (as shown in FIG. 2B), the system 200B determines sensitive information to obfuscate and then displays one or more obfuscations 226, 232 to obfuscate sensitive information. In the event that no sensitive information is being displayed on the electronic device 201, no obfuscations 226, 232 are initiated. When in a secure browsing session state, once sensitive information is to be displayed on the electronic device 201, the obfuscations 226, 232 may appear automatically.

The secure browsing session state shown in FIG. 2B may be a global state. In other words, the secure session toggled 204 applies a security protocol (e.g., obfuscation) for all sensitive information to be displayed on the electronic device 201. In some embodiments, local security protocols may be applied to remove obfuscations and reveal sensitive information to the user based upon one or more indications by the user (e.g., local security triggers). One such local security toggle is shown in FIG. 2C.

Turning now to FIG. 2C, system 200C is shown executing a secure browsing session with a local security toggle 238 on the electronic device 201, according to an exemplary embodiment. As discussed above, in some embodiments, the system 200C may include a local secure session toggle 238. In some embodiments, the system 200C may include more than one local secure session toggles 238. As shown in FIG. 2C, the global secure session toggle 204 is set to an "ON" state, thus causing the system 200C to execute a secure browsing session. This secure browsing session may be considered a global secure browsing session in which all (or a preselected portion) of sensitive information is obfuscated from the user's view on the electronic device 201. While system 200C may obfuscate the sensitive information by blurring (or otherwise adjusting a visual attribute of the display of the sensitive information on the electronic device 201), in other embodiments (such as illustrated in FIG. 2C), the system 200C may obscure the view of the sensitive information with the local secure session toggle 238. The local secure session toggle 238 may be an interactive graphical element with which the user may interact. In some embodiments, the local secure session toggle 238 may have one or more visual attributes that match or reflect one or more visual attributes of the look and feel of graphical elements displayed on the electronic device 201. In some embodiments, the system 200C identifies the one or more visual attributes of the look and feel of the elements displayed on the electronic device 201 (e.g., as presented by the mobile application) and the system 200C matches the identified one or more visual attributes.

The local secure session toggle 238 may be an interactive graphical element configured to receive a user interaction to toggle the state of the local secure session toggle 238. For example, the user may click (or touch), click and hold, swipe, look at, speak, gesture, tactilely indicate, or any combination thereof, to interact with the local secure session toggle 238. Upon the local secure session toggle 238 receiving the interaction (e.g., indication) from the user, the system 200C toggles the state of the local secure session toggle 238.

By way of example, FIG. 2C shows the system 200C in a global secure browsing session due to the secure session toggle 204 being in an "ON" state. In the secure session, the local secure session toggle 238 obfuscates all (or predetermined) sensitive information (e.g., the savings account amount 220 of FIG. 2A). The user may interact (e.g., click) the local secure session toggle 238. Upon receiving the indication of the click on the local secure session toggle 238, the system 200C may automatically toggle the state of the local secure session toggle 238 to a locally default browsing session. In the locally default browsing session, one or more sensitive information is revealed on the display of the electronic device 201 for the user's viewing. For example, responsive to the user clicking the local secure session toggle 238 on the savings account 208, the local secure session toggle 238 may be replaced, adjusted, or removed to display the savings account amount 220 of FIG. 2A. In some embodiments, only the local secure session toggle 238 is replaced, adjusted, or removed to display the obfuscated sensitive information. However, in some embodiments, several obfuscations may be replaced (or removed) upon an interaction with the local secure session toggle 238.

By way of example, an obfuscation 240 of the first five digits of the savings account number 214 of FIG. 2A may be removed upon the user interacting with the local secure session toggle 238. In some embodiments, both the obfuscation 240 and the local secure session toggle 238 are replaced, adjusted, or removed upon an interaction with the local secure session toggle 238 by the user to reveal the obfuscated sensitive information. All sensitive information within a group of elements may be viewed and hidden together through a linking of the sensitive information. For example, all sensitive information (e.g., the savings account number 214 and/or the savings account amount 220 of FIG. 2A) within the savings account 208 may be linked together (e.g., by metadata labels) so that revealing one sensitive information (e.g., the savings account number 214 or the savings account amount 220 of FIG. 2A) reveals all of the linked sensitive information. The system 200C may automatically link the sensitive information based on metadata or one or more linking rules. In some embodiments, the user's interaction with the local secure session toggle 238 reveals (e.g., by replacing or removing the obfuscations) all sensitive information currently presentable on the electronic device 201 screen (e.g., the checking account number 212, the savings account number 214, the credit account number 216, the checking account amount 218, the savings account amount 220, and the credit account amount of FIG. 2A). The revealing of certain sensitive information through the use of the local secure session toggle 238 may be independent of the state of the secure session toggle 204. For example, although the secure session toggle 204 may be toggled to an "ON" state for a secure browsing session, the interaction with the local secure session toggle 238 may override (or supplant) the obfuscation of the sensitive information associated with the local secure session toggle 238.

Figure 2D:
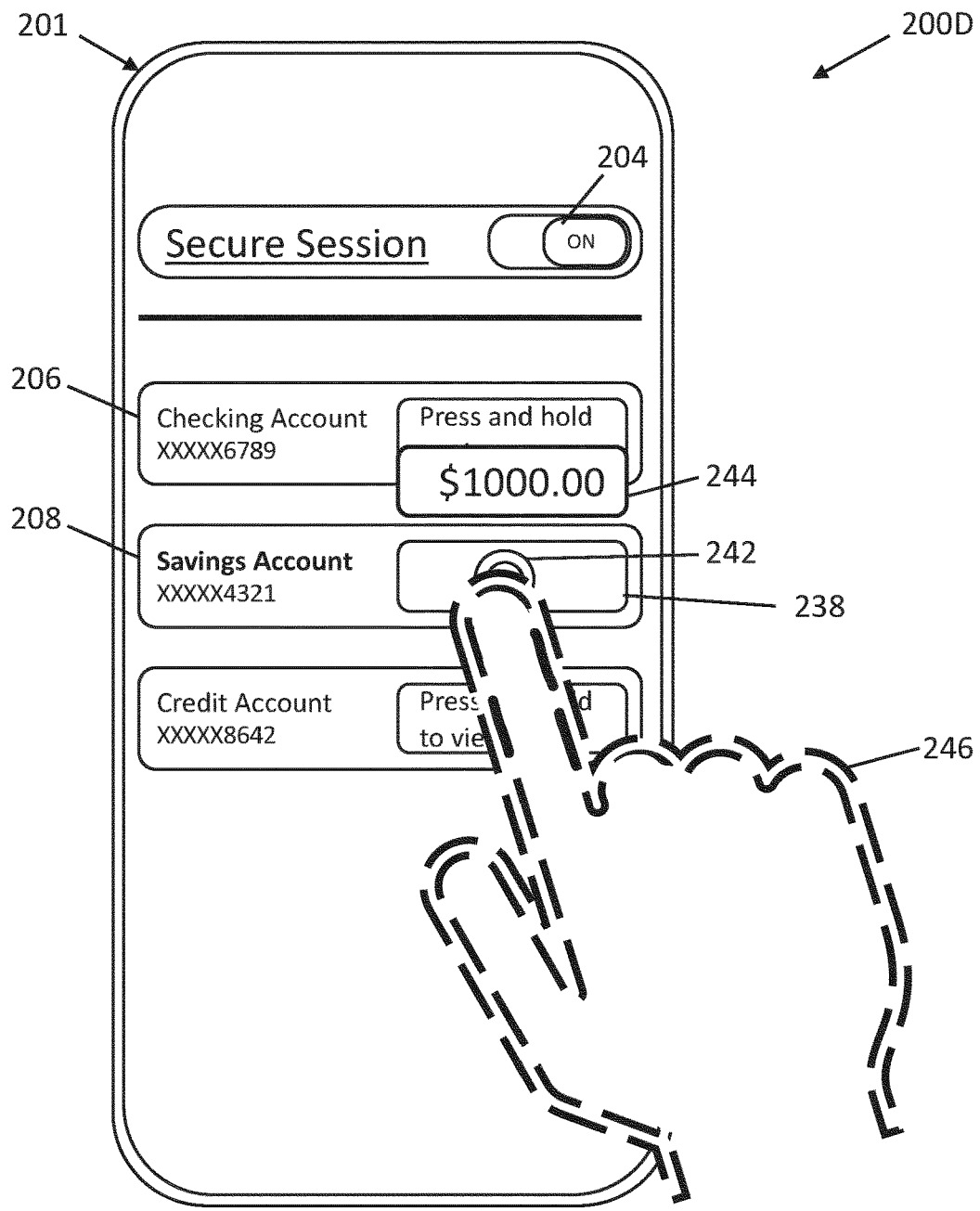
FIG. 2D is a depiction of an electronic device executing a secure browsing session while revealing sensitive information in response to a user's interaction with the electronic device, according to an embodiment.

Turning now to FIG. 2D, a system 200D is shown executing a secure browsing session on the electronic device 201, according to an exemplary embodiment. Upon interacting with the local secure session toggle 238, the system 200D may present/reveal one or more obfuscated data. For example, an interaction 242 with the local secure session toggle 238 may result in revealing sensitive information 244. In the example illustrated in FIG. 2D, the sensitive information 244 may be the savings account amount 220 of FIG. 2A. In some embodiments, the user must interact with the screen of the electronic device 201 in a prescribed manner in order to toggle the local secure session toggle 238. In one exemplary embodiment, the user must press and hold a graphical element associated with the local secure session toggle 238 to toggle the state of the local secure session toggle 238. In such an embodiment, the sensitive information 244 may be presented for display to the user on the screen of the electronic device 201 in a graphical element responsive to the system 200D receiving the indication that the user has interacted with the local secure session toggle 238 through the interaction 242. The graphical element may have one or more visual attributes that correspond to the identified visual attributes of the elements presented on the electronic device 201, as described herein. In one or more embodiments, the sensitive information 244 may be presented in the graphical element in the same position as the local secure session toggle 238. However, in some embodiments, the graphical element in which the sensitive information 244 is displayed may be positioned in any combination of above, below, left of, and/or right of the local secure session toggle 238. In this manner, the user may press and hold the local secure session toggle 238 while still being able to view the sensitive information 244. In some embodiments, the system 200D identifies a location of the local secure session toggle 238 and/or the obfuscated data. The system 200D then determines a location on the screen of the electronic device 201 to display the sensitive information 244 such that the user's interaction (e.g., click and hold) does not interfere with a determined viewing angle of the user. The system 200D may determine the viewing angle of the user based on one or more external sensors of the electronic device 201 (e.g., a camera, proximity sensor, thermal imaging device, LIDAR, microphone, ambient light sensor, dot projector, flood illuminator, orientation sensor, capacitive screen sensor, etc.). Using the one or more external sensors, the system 200D may determine a position and orientation of the user with respect to the electronic device 201. In comparing the position and orientation of the user with the position and orientation of the electronic device 201, the system 200D may identify a viewing angle of the user. Additionally, or alternatively, the system 200D may identify which hand 246 the user is utilizing to interact with the local secure session toggle 238. By way of example, the 200D may use the one or more external sensors to determine the hand 246 (or finger) used to interact with the local secure session toggle 238. Using one or more of the position and orientation of the user, the position and orientation of the electronic device 201, and/or the hand 246 used by the user, the system 200D may determine a location and orientation on the display of the electronic device 201 to present the sensitive information 244. For example, if the system 200D determines that the user is utilizing a right thumb to interact with local secure session toggle 238 by pressing and holding, the system 200D may display the sensitive information 244 above the local secure session toggle 238, as shown in FIG. 2D.

In some embodiments, the sensitive information 244 is only revealed so long as the user continues holding the local secure session toggle 238. In other embodiments, the sensitive information 244 is revealed in response to the interaction 242 and displayed for a predetermined amount of time (independent of whether the user continues holding the click) before being obfuscated again. For example, the user may tap the local secure session toggle 238 (shown as the interaction 242). In response to receiving an indication of the interaction 242, the 200D may reveal the sensitive information 244 (e.g., in the place of local secure session toggle 238 or in a position visible to the user, as described above). The system 200D calculates, or otherwise determines, a length of time that the sensitive information 244 is displayed. In response to the length of time exceeding a predetermine threshold (e.g., 5 seconds), the sensitive information 244 is obfuscated again. In some embodiments, the sensitive information 244 is revealed until a second interaction is received from the user. For example, the sensitive information 244 is revealed upon the user interacting (e.g., tapping) with the local secure session toggle 238. The sensitive information 244 remains revealed until the user interacts (e.g., taps again) with the local secure session toggle 238. Upon receiving a second indication for the second interaction, the sensitive information 244 is obscured again.

In some embodiments, the systems 200A-200D may be the same system. In some embodiments, the systems 200A-200D may be executed across more than one electronic device. By way of example, the systems 200A-200D may be used in a customer service environment. In such an embodiment, a user may initiate a communication with a customer service representative. The customer service representative may request remote viewing capabilities of the screen of the user's electronic device (e.g., mobile device, computing device, tablet). Upon the user granting viewing capabilities, the user may also select the secure browsing session state by interacting with the secure session toggle 204 to an "ON" state. Upon granting the customer service representative viewing access and selecting a secure session, the customer representative's electronic device will display a mirror of the user's electronic device's screen. In one embodiment, the user's electronic device displays all sensitive information unobscured while the customer service representative's electronic device displays a mirror of the user's electronic device's screen but with obscured sensitive information. In other embodiments, both the user's electronic device and the customer service representative's electronic device display obscured sensitive information. In such embodiments, the user may interact with the user's electronic device (e.g., as described in FIG. 2D) to reveal the obscured sensitive information on the user's electronic device only. For example, the customer service representative's electronic device continues to display the obscured sensitive information while the user's electronic device displays the revealed sensitive information. In some embodiments, the user may selectively reveal the sensitive information for display on the customer service representative's electronic device.

Turning now to FIG. 3, a process 300 for executing a secure browsing session is illustrated, according to an exemplary embodiment. The process 300 may include one or more of steps 310-350. The process 300 may include different, fewer, or more steps than steps 310-350. Steps 310-350 are illustrated in FIG. 3 in a specific order, but the process 300 may be executed in any order or timing without extending beyond the scope of the present disclosure. In the description of FIG. 3, the terms sensitive information and personally identifiable information are used interchangeably.

The process 300 may include step 310. The step 310 may include receiving a first indication to enter a secure browsing mode of a session. In one embodiment, the indication may be received by one or more processors associated with an electronic device. The electronic device may include an output device (e.g., a display, a screen, a speaker, a haptic device) and/or an input device (e.g., an interactive display, microphone, touch sensors). The one or more processors of the electronic device present by the output device an option to choose between one or more states associated with a secure browsing mode. In some embodiments, the option is between a first state (e.g., "ON," secure browsing state, etc.) and a second state (e.g., "OFF," default browsing state, etc.). This option may be associated with a global security state status. In other words, the first indication may be associated with a general security browsing level (e.g., secure or default). The user interacts with the input device (e.g., clicking, sliding, tapping, tapping and holding, speaking into, looking at, gesturing, etc.) to make a selection between the two options. For example, the user taps an interactive element associated with the options on the screen of the electronic device to select a secure browsing session state. The one or more processors process the interaction and receive an indication associated with the user's interaction (e.g., tap) and associated request to enter the secure browsing session state. In some embodiments, the indication comes from a predefined trigger other than a user interaction, such as a time of day, geofence location, type of sensitive information to be displayed, mobile application being executed, etc. This indication may be processed, and a security browsing state may be set to secure. In other words, the system enters a secure browsing session.

The process 300 may include step 320. The step 320 may include presenting data associated with the user for display on the display of the electronic device. Responsive to the one or more processors receiving the indication of the interaction associated with toggling the secure browsing state to an "ON" position, the one or more processors set the security state to a secure browsing session state. In this state the one or more processors present data for display on the electronic device. This presentation may be of graphical elements on a graphical user interface on a display of the electronic device. This presentation may be an auditory signal. This presentation may be haptic feedback. Regardless of the manner in which the data is presented, the data is presented for display. In some embodiments, the electronic device is comprised of one or more discrete components. For example, a mobile device wirelessly and communicatively coupled to a headset (e.g., virtual reality headset or augmented reality headset). In such embodiments, the one or more processors may be split across discrete components comprising the electronic device. The data may be associated with the user. By way of example, the electronic device may be executing a mobile application of a financial institution, and the data being presented for display is associated with the user's financial institution account.

The process 300 may include step 330. The step 330 may include causing the display to obscure one or more personally identifiable information of the data on the display of the electronic device. When presenting for display the information and/or data, the one or more processors obfuscate one or more sensitive information. In some embodiments, the sensitive information is personally identifiable information. In other embodiments, the sensitive information is not personally identifiable information, but still sensitive to the user (as described herein). The data may be tagged as sensitive, and the one or more processors may be able to interpret the tagged status information. In other embodiments, the one or more processors may determine which data is sensitive based on a format of the information, certain numerical attributes or sensitive information, and or context of the graphical user interface on which the information is presented for display.

The one or more processors obfuscate the determined sensitive information in one or more ways. For example, the sensitive information may be covered by a graphical element of the displayed graphical user interface. By way of example, a graphical element may be superimposed on the sensitive information, such as a local secure session toggle as described in FIG. 2C. In other embodiments, the one or more processors alter the presentation of the sensitive information itself. For example, one or more attributes of the sensitive information (e.g., size, color, font, sharpness, contrast, clarity, blur, etc.) are altered to obfuscate the sensitive information. By way of example, the sensitive information may be blurred through a gaussian blur low-pass filter. Additionally, or alternatively, the color of the sensitive information display may be adjusted to remove the contrast between the background color. In some embodiments, the sensitive information is replaced with replacement font (e.g., "X's"). In other embodiments, the sensitive information is simply not displayed.

In some embodiments, in which the sensitive information is presented for display auditorily, the one or more processors may alter the sound of the sensitive information to be unrecognizable. For example, the sensitive information may be scrambled, the sound may be reduced, or the sensitive information may be replaced with a placeholder noise or spoken words.

The process 300 may include step 340. The step 340 may include receiving a second indication to reveal the one or more personally identifiable information. The one or more processors may be configured to receive a second indication of the user's second interaction with the electronic device (or electronic device component). In some embodiments, this second interaction is associated with a requested switch in the security state of the browsing state or the security state of a specific sensitive information. For example, the second interaction may be with a local security session toggle (e.g., the local secure session toggle 238 of FIG. 2C). This second interaction may be a press and hold, a tap, a swipe, a gesture, a removing of a click, and/or a click of a graphical element presented for display on the electronic device.

In one embodiment, the local security session toggle is a graphical element superimposed on the sensitive information so as to obfuscate the sensitive information from being displayed. The user's interaction with the local security session toggle sends the second indication to the one or more processors. Upon determining that the second indication is associated with a request to adjust a security browsing status of the sensitive information, the one or more processors may adjust the obfuscation of the sensitive information.

The process 300 may include step 350. The step 350 may include presenting the one or more personally identifiable information for display on the display of the electronic device. Upon receiving the second indication, the one or more processors may remove or replace the obfuscation of the sensitive information with the revealed sensitive information. In some embodiments, multiple items of sensitive information are revealed in response to the second indication. In other embodiments, only a single sensitive information is revealed in response to the second indication. The adjustments made to obfuscate the sensitive data in step 330 may be reversed to reveal the sensitive data. In other embodiments, the sensitive data is simply presented for display again. The sensitive information may be revealed for a period of time (e.g., 5 seconds), after which time the sensitive information is obfuscated again. In other embodiments, the sensitive information is revealed for as long as the one or more processors receive the second indication (e.g., as long as the user is pressing and holding the local security session toggle).

In some embodiments, as described above, the sensitive information is displayed in a position and orientation that is visible to the user. By way of example, if the user is required to press and hold the local security session toggle which is superimposed on the sensitive information to obfuscate it, the sensitive information may be presented above the original placement so the user's thumb is not blocking the sensitive information when it is revealed. Once the one or more processors stop receiving the second indication associated with the second interaction, the one or more processors may revert to obfuscating (or causing to obfuscate) the sensitive information.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be a computer-implemented process, implemented in software, firmware, middleware, microcode, hardware description languages, or any combination thereof. A code segment or machine-executable/machine-readable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
 receiving, by one or more processors from a user device of a user, a first indication to enter a secure browsing mode of a session;
 presenting, by the one or more processors, data associated with the user for display on a display of the user device, the data including one or more personally identifiable information of the user;
 applying, by the one or more processors, an obfuscation to the one or more personally identifiable information of the user on the display of the user device;
 receiving, by the one or more processors from the user device, a second indication to remove the obfuscation to the one or more personally identifiable information to reveal the one or more personally identifiable information;
 removing, by the one or more processors, the obfuscation from the one or more personally identifiable information of the user for a predetermined period of time after receiving the second indication for display on the display of the user device; and
 causing, by the one or more processors, the display to obfuscate the one or more personally identifiable information of the user on the display of the user device after the predetermined period of time passes.

2. The computer-implemented method of claim 1, wherein the one or more processors cause the display of the user device to obscure the one or more personally identifiable information of the data on the display of the user device by blurring the one or more personally identifiable information.

3. The computer-implemented method of claim 1, wherein the one or more processors receive the second indication in response to the user interacting with the obscured personally identifiable information.

4. The computer-implemented method of claim 1, further comprising:
   presenting, by the one or more processors, the one or more personally identifiable information for display on the display of the user device while the one or more processors are receiving the second indication; and
   causing, by the one or more processors, the display to obscure the one or more personally identifiable information of the data on the display of the user device when the one or more processors stop receiving the second indication.

5. The computer-implemented method of claim 1, wherein an electronic device is associated with a second user and the second indication is received from the user device associated with the user.

6. The computer-implemented method of claim 1, wherein the session is associated with a browsing session of a financial institution account associated with the user.

7. A system comprising:
   a user device including a display; and
   one or more processors configured to execute machine-readable instructions to perform steps comprising:
      receiving from the user device associated with a user a first indication to enter a secure browsing mode of a session;
      presenting data associated with the user for display on the display of the user device, the data including one or more personally identifiable information of the user;
      applying an obfuscation to the one or more personally identifiable information of the user on the display of the user device;
      receiving from the user device a second indication to remove the obfuscation to the one or more personally identifiable information of the user to reveal the one or more personally identifiable information of the user;
      removing the obfuscation from the one or more personally identifiable information of the user for a predetermined period of time after receiving the second indication for display on the display of the user device; and
      cause the display to obfuscate the one or more personally identifiable information of the user on the display of the user device after the predetermined period of time passes.

8. The system of claim 7, wherein the one or more processors are further configured to cause the display of the user device to obscure the one or more personally identifiable information of the user on the display of the user device by blurring the one or more personally identifiable information of the user.

9. The system of claim 7, wherein the one or more processors are further configured to receive the second indication in response to the user interacting with the obscured personally identifiable information of the user.

10. The system of claim 7, the one or more processors further configured to:
    present the one or more personally identifiable information of the user for display on the display of the user device while the one or more processors are receiving the second indication; and
    cause the display to obscure the one or more personally identifiable information of the user on the display of the user device when the one or more processors stop receiving the second indication.

11. The system of claim 7, wherein an electronic device is associated with a second user and the second indication is received from the user device associated with the user.

12. The system of claim 7, wherein the session is associated with a browsing session of a financial institution account associated with the user.

13. A computer-readable medium comprising a non-transitory storage memory configured to store machine-readable instructions that when executed by one or more processors instruct the one or more processors to perform steps comprising:
    receiving from an user device associated with a user a first indication to enter a secure browsing mode of a session;
    presenting data associated with the user for display on a display of the user device;
    applying an obfuscation to one or more personally identifiable information of the user on the display of the user device;
    receiving from the user device a second indication to remove the obfuscation to the one or more personally identifiable information of the user to reveal the one or more personally identifiable information of the user;
    removing the obfuscation from the one or more personally identifiable information of the user for a predetermined period of time after receiving the second indication for display on the display of the user device; and
    causing the display to obfuscate the one or more personally identifiable information of the user on the display of the user device after the predetermined period of time passes.

14. The computer-readable medium of claim 13, wherein the one or more processors are further configured to cause the display of the user device to obscure the one or more personally identifiable information of the user on the display of the user device by blurring the one or more personally identifiable information of the user.

15. The computer-readable medium of claim 13, wherein the one or more processors are further configured to receive the second indication in response to the user interacting with the obscured personally identifiable information of the user.

16. The computer-readable medium of claim 13, the one or more processors further configured to:
    present the one or more personally identifiable information of the user for display on the display of the user device while the one or more processors are receiving the second indication; and
    cause the display to obscure the one or more personally identifiable information of the user on the display of the user device when the one or more processors stop receiving the second indication.

17. The computer-readable medium of claim 13, wherein an electronic device is associated with a second user and the second indication is received from the user device associated with the user.

* * * * *